United States Patent [19]

Matsumura et al.

[11] Patent Number: 4,730,649
[45] Date of Patent: Mar. 15, 1988

[54] LIQUID DELIVERY NOZZLE

[75] Inventors: Hiroshi Matsumura; Siro Masai; Noboru Oguma; Haruhisa Yamada, all of Tokyo, Japan

[73] Assignee: Tokyo Tatsuno Co., Ltd., Tokyo, Japan

[21] Appl. No.: 906,010

[22] Filed: Sep. 11, 1986

[30] Foreign Application Priority Data

Sep. 13, 1985 [JP] Japan .................. 60-201672
Feb. 17, 1986 [JP] Japan .................. 61-30955

[51] Int. Cl.$^4$ .................. B67C 5/377; B65B 3/36
[52] U.S. Cl. .................. 141/95; 141/128
[58] Field of Search .................. 141/1–12, 141/94, 95, 96, 128, 192–229, 346–362, 285–310, 37–70; 222/14, 16, 17, 20, 23

[56] References Cited

U.S. PATENT DOCUMENTS 4,522,237 6/1985 Endo et al. .................. 141/95

Primary Examiner—Houston S. Bell, Jr.
Attorney, Agent, or Firm—Sughrue, Mion, Zinn, Macpeak, and Seas

[57] ABSTRACT

A liquid delivery nozzle to be used in gasoline stations comprising two pairs of light sensor in which the first pair arranged at the tip end of the nozzle is of reflection type and the second pair arranged a little higher up from said first pair is of usual contact type, for more relevantly coping with full tank delivery. The sensors are mounted in a casing which is to be mounted on the nozzle inner wall surface near the tip end. In order to prevent leads extending through said nozzle and a hose connected therewith for angular movement from being damaged due to such angular movement, a flexible sheet on which leads are printed or embedded, has a part wound to form several spiral turns. The sheet is arranged in the portion where angular movement occurs to cope with such movement by loosening or tightening of the spiral turns.

10 Claims, 10 Drawing Figures

LIQUID DELIVERY NOZZLE

TECHNICAL FIELD OF THE INVENTION AND RELATED ART

This invention relates to an apparatus for dispensing liquid such as fuel for automobiles, and more particularly to a delivery nozzle to be used in such apparatus.

In gasoline stations, fuel is generally supplied to a tank of the vehicle. Such dispensation must be carefully made in order to avoid possible overflow of the fuel from the top open end of a filler pipe connected to the vehicle fuel tank. It has been proposed for a long time to provide an automatic delivery nozzle having a fuel level sensor mounted at the tip end of said nozzle so that when a rising level of the fuel is detected by the sensor, the corresponding signal is given, in reply to which fuel delivery may be automatically stopped (for instance, see U.S. Pat. No. 3,085,600).

However, there is a problem of fuel surging that may take place particularly within the filler pipe of the tank being filled so that fuel that splashes or bubbles may give a false level detection with an early cut-off of the fuel supply. Naturally further delivery must be made until the tank is desiredly filled up. When such further delivery is made in haste or carelessly, splashes or bubbles cause the supply to stop again. It is not always so easy to cope with such a problem even by the skilled operator, since the manner or nature of the surges are considerably varied depending on size, shape and position of the filler pipe which are different from one vehicle to another.

In order to avoid this defect of the automatic delivery nozzle having the level sensor of the contact type, some proposals have been made in the prior art. For instance, U.S. Pat. No. 3,916,961 discloses control apparatus including a pump and a delivery nozzle, comprising the level detector positioned on outside of the nozzle tip end so as to be unaffected by normal delivery through the nozzle but responsive to fluid surge against delivery from the nozzle, and control means arranged to control the delivery of liquid from said pump in response to the detection of fluid surge or liquid rise by the detector. The control means is adapted to cause liquid delivery by the pump at a first flow rate on receipt of a starting signal, to cause delivery at a lower flow rate on receipt of a first signal from said detector, and to terminate delivery on receipt of a second signal from a second detector positioned similarly on the nozzle outer surface but higher up from the tip end.

U.S. Pat. No. 4,522,237, which was assigned to Tokyo Tatsuno Co., Lltd., Tokyo to which the present patent application also is to be assinged, proposes the similar apparatus in which the delivery nozzle comprises the level detector positioned similarly at the tip end but on the inner surface liquid tightly covered by a casing so as to be unaffected by normal delivery through the nozzle. Control means are adapted to stop delivery in response to the detection of fluid surge and restart delivery after the lapse of time during which splashes or bubbles disappear, for instance 3 seconds at a lower flow rate and repeat the operation with stepwise decreased flow rate.

According to such control apparatus in which liquid contact type detector or sensor is provided, however, it is difficult to completely prevent overflow since closing or throttling of the valve can be made only after detection by contact of the sensor with liquid at the tip end of the nozzle, which can not be made so long in view of convenience of nozzle handling.

It has been found that when using a first liquid level sensor of the reflection type for instance, comprising a light emitter such as a light emitting diode and a light receiver such as a photo-transistor both located at the tip end of the nozzle and respectively directed so that light generated by the emitter and reflected from liquid splashes or bubbles may be sensed by the receiver, in addition to the sensor of contact type which may be the similar combination of the emitter and the receiver, positioned higher up from the nozzle tip end and directed to oppose with each other, the problem of overflow may be readily and completely prevented without adversely affecting on the delivery efficiency.

The sensitivity of said first sensor will have to be made higher than the second one so as to relevantly detect splashes or bubbles existing for instance 5 cm ahead, which may be adjusted down to e.g. 3 cm or up to e.g. 10 cm.

The sensor elements are preferably mounted not on the outer surface of the nozzle but on the inner surface thereof, in view of protection thereof. In this case, however, the elemets must be completely prevented from contacting the liquid being delivered through the nozzle and readily mounted in the correct position.

Meanwhile, the delivery nozzle is usually provided with a swivel joint through which a flexible conduit or hose is connected or a further swivel joint so that an elbow is mounted between the two swivel joints to readily handle the nozzle. A cable consisting of a plurality of lead wires for connecting the sensors with an electric source for energizing said emitter elements and with control means for transmitting signals generated by said receiver elements thereto, extends from the tip end through the delivery nozzle, via the portion where the relative angular movent between the nozzle and the hose occurs and through said hose to the casing where said electric source and control means are provided. In order to prevent the cable from being twisted which may cause breakage thereof, any particular countermeasure must be provided. Japanese U.M. Gazette Sho51-4324 for Examined Application discloses stopper means for avoiding angular movement of more than 360° but this is still insufficient.

SUMMARY OF THE INVENTION

An object of the invention is, thus, to provide a liquid delivery nozzle capable of detecting the rising liquid level at an earlier stage to more relevantly cope with throttling the amount of liquid being delivered and consequently prevent liquid splashes and bubbles from overflowing out of the opening through which the nozzle is inserted.

The object can be attained according to the invention by using a sensor of the reflection type which preferably comprises a light emitter such as a light emitting diode and a light receiver such as a phototransistor to be mounted at the tip end of the nozzle, in addition to the conventional sensor of the contact type to be located higher up from said first sensor, both of the sensors being preferably mounted on the inner surface of the nozzle.

Another object of the invention is to provide a liquid delivery nozzle having a flexible hose connected thereto via swivel joint means, the nozzle comprising a connector chamber provided opposite to the portion of the nozzle where the flexible hose is connected thereto so as to connect a first lead wire extending through a hose and a second lead wire extending through a nozzle sensor to an electric source and a control means for valve means without causing any trouble of the lead wire despite severe angular movement of said hose relative to the nozzle.

An additional object of the invention is to provide a liquid delivery nozzle readily mounted with a sensor casing in the correct position to which the sensors may be readily mounted, so as to completely seal a sensor chamber defined by the casing and the corresponding portion of the nozzle inner wall surface on which the casing is mounted so that the sensors are unaffected by liquid being delivered through the nozzle and allow free penetration of liquid rising up into said sensor chamber to assure correct detection.

The invention will be explained hereafter in more detail in respect of the most preferred mode of the invention which is illustrated in the accompanying drawing.

DETAILED EXPLANATION OF THE INVENTION

Figure 1:
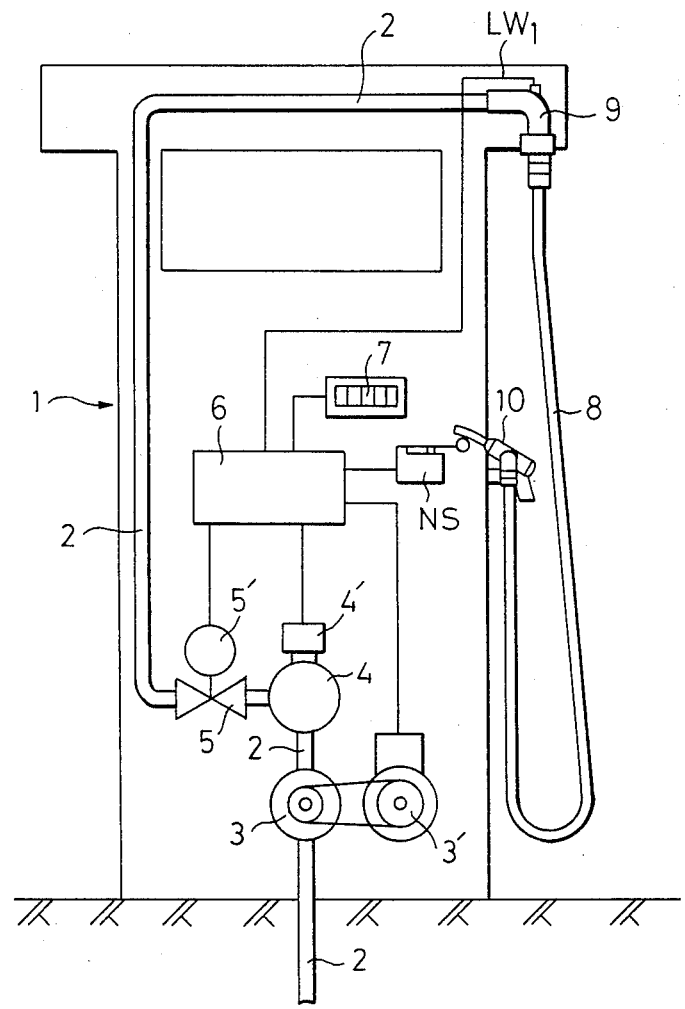
FIG. 1 is a diagramatic illustration of the apparatus in which the liquid delivery nozzle according to the invention is used.

In reference to FIG. 1, a fuel dispenser for automobiles or the like vehicles, in which the delivery nozzle according to the invention is used, is represented generally by 1. It comprises a conduit 2 connecting a reservoir (not shown) under the ground with a pump 3 driven by a motor 3'. Liquid or fuel pumped up is fed through the conduit 2 to pass a flow meter 4 and valve means 5. A signal from the flow pulse generator 4' passes through control means 6 to indicate the amount of fuel being delivered on an indicator 7. Fuel is further fed through the conduit 2 and a flexible hose 8 connected with the free end thereof via an elbow 9 to a fuel delivery nozzle 10 mounted at the free end of said hose via swivel joint means.

At the elbow 9 a lead wire LW1 extending from sensors is taken out to be connected with control means 6 so that the valve 5 may be actuated by an actuator 5' depending on signal given from said sensors.

Figure 2:
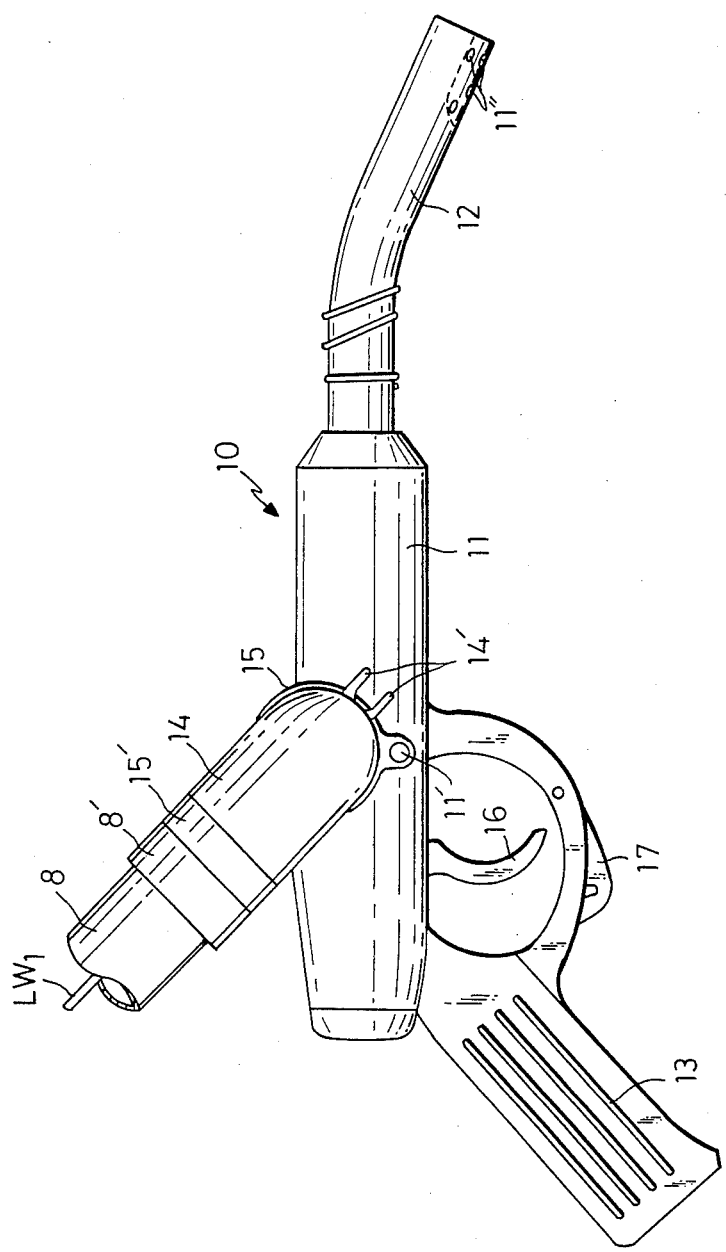
FIG. 2 is a side elevation of said delivery nozzle.
Figure 3:
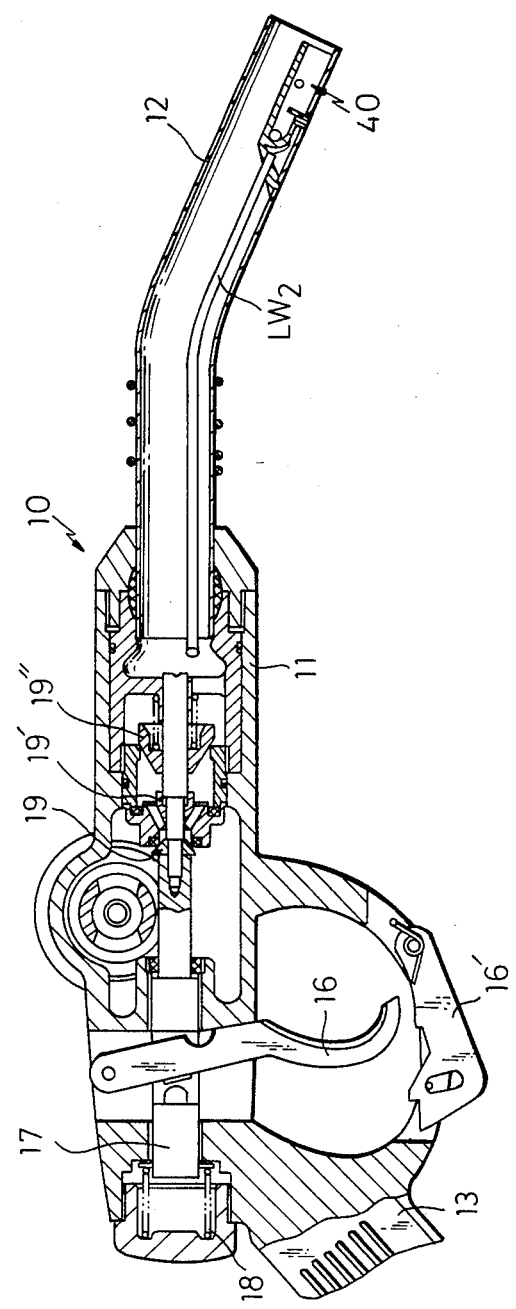
FIG. 3 is a sectional view of the above in which a handle, to be gripped by the user, is partly cut off.
Figure 4:
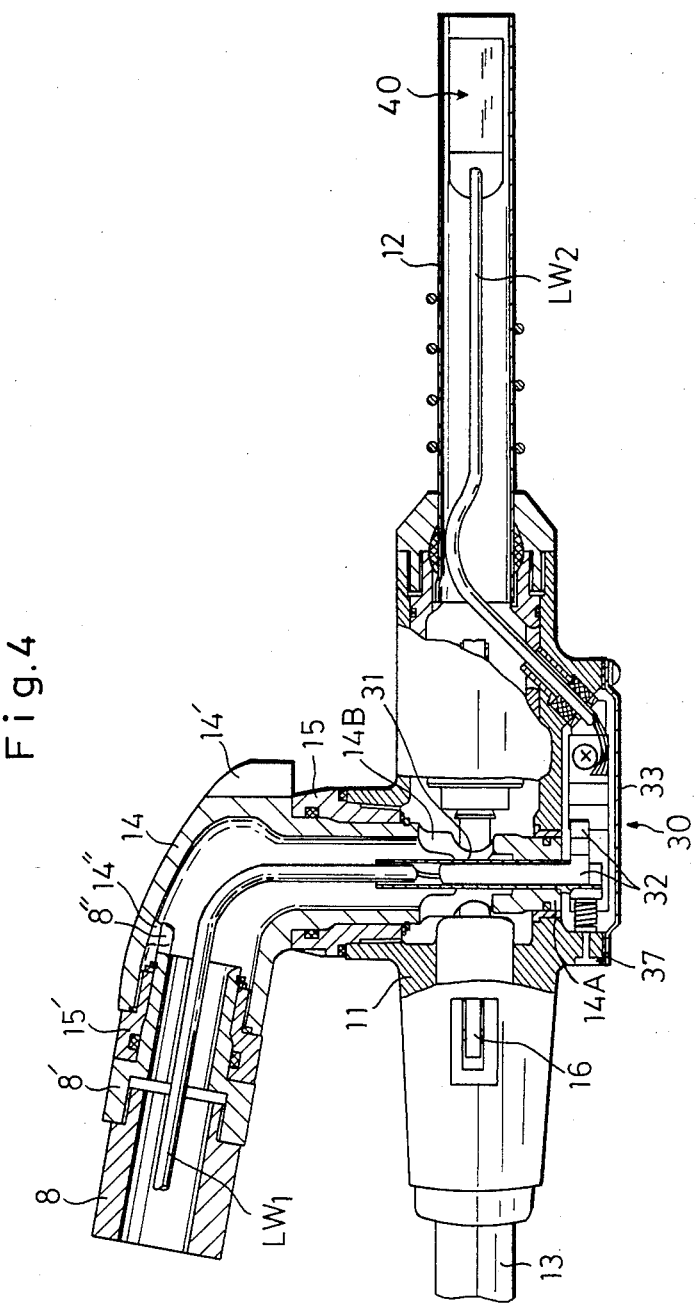
FIG. 4 is a top plan view of said nozzle partly in section.

Now in reference mainly to FIGS. 2, 3 and 4, the delivery nozzle represented generally by 10 is explained in more detail.

The nozzle 10 comprises a cylindrical body portion 11, a barrel portion 12 connected thereto and coaxially extending therefrom to have a liquid outlet at the free end thereof. A grip portion 13 extends obliquely downwards from body portion 11.

An elbow 14 has one half thereof inserted to extend diametrically in the cylindrical body portion 11 via a first swivel joint 15 so that the free end 14A of the elbow 14 is liquid tightly held, as best shown in FIG. 4, on the inner wall of a connector chamber to be referred later in detail for relative angular movement. This half of the elbow 14 has an opening 14B (FIG. 4) in fluid communication with end 14A to provide a liquid flow path into the body portion. The flexible hose 8 having a mount 8' fixed at the free end thereof is connected with the elbow 14 at the other end thereof via a second swivel joint 15' to feed liquid such as fuel into the body portion 11. The elbow 14 has a pair of projections 14' abutting on a pin 11' planted on the peripheral wall of the body portion 11 to limit the angular movement of the elbow 14 relative to the body portion 11 to less than 360°. It is also preferable to provide an inward protrusion 8" on the inner end of said mount 8' to abut on a stopper 14" formed at the inner wall of said elbow 14 for limiting the relative movement less than 360°.

A trigger 16 is provided to be actuated by a finger of the hand holding the grip portion 13 whereby valve means arranged in the body portion 11 is correspondingly actuated to control the flow of liquid to be delivered out of the liquid outlet or the nozzle tip end. A latch 16' having steps and normally held in position by spring means may be engaged at any desired one of the steps with the free end of said trigger 16 so that even if the finger is remove therefrom, the valve means may desiredly control the liquid flow. There are formed a plurality of holes 11" in the peripheral wall of the barrel portion 12 at the vicinity of the tip end for the purpose to be explained later in detail. The portion surrounded by phantom lines in FIG. 2 illustrates a sensor casing represented generally by 40 (see FIGS. 3 and 4) is mounted.

As best shown in FIG. 3, there are provided in the body portion 11 a valve stem 17 longitudinally extending therein, spring means 18 at the rear end thereof and valves 19, 19' and 19" at the front area thereof so that the spring means 18 normally urges the valve 19 to close via said stem 17. When pulling the trigger 16 to actuate the valve stem 17 against the force of the spring 18, the small valve 19 is adapted firstly open to release strong liquid pressure and then the main valve 19' is open to allow liquid under pressure to enter the chamber defined between said main valve 19' and the check valve 19" which is open due to high pressure of liquid existing in the chamber to deliver liquid through the barrel portion 11.

FIG. 4 illustrates the first lead wire LW1, extending from the control means 6 through the flexible hose 8 and the second lead wire LW2 extending through the barrel portion 12 to be electrically connected to the sensors mounted in the sensor casing 40 for supplying electric energy thereto and transmitting signals generated thereby. The first lead wire LW1 and second lead wire LW2 are electrically connected together by connector means 30 according to one aspect of the invention.

Figure 6:
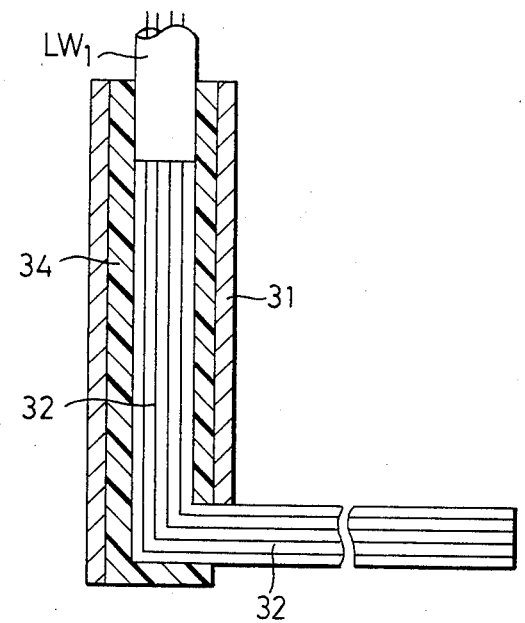
FIG. 6 is a side elevation of the connector partly in section.

The connector means 30 essentially comprises a sleeve 31 coaxially extending in one half of the elbos 14 and fixed thereto which diametrically intersects the body portion 11 for angular movement thereto. A flat and flexible web 32, on which a plurality of leads (four leads in this illustrated embodiment) are printed or in which said leads are embedded, extended to form a L-shape as best shown in FIG. 6. A connector chamber 33 is provided at the peripheral wall of the body portion 11 opposite to the portion where the elbow 14 is inserted in the body portion 11.

A vertical section of the L-shaped web 32 passes through the sleeve 31 so that the leads of the web 32 are electrically connected with the respective leads of the wire LW1. It is preferable to fill the space formed between the inner wall surface of the sleeve 31 and the web 32 with any suitable material such as epoxy resin 34.

Figure 5:
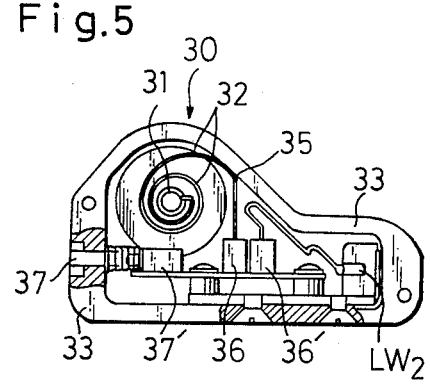
FIG. 5 is a side elevation of the lead wire connector chamber partly in section.

The transversely extending section of the L-shaped lead web as illustrated in FIGS. 4 and 5 is loosely wound around sleeeve 31 to form a few turns. As best shown in FIG. 5 even when the elbow 14 and consequently said sleeve 31 is angularly moved relative to the body portion 11 and consequently to the connector chamber 33 in either direction, this relative movement causes only loosening or tightening of the spiral turns to ensure reliable detection of the liquid level. A portion of the lead web 32 is preferably fixed 35 to the inner wall of the connector chamber 33. The free ends of web 32 are electrically connected with the respective leads of the wire LW2 through a first and second terminal 36, 36+ provided in chamber 33.

Althrough it has no direct connection with the invention, a push button 37 and a switch 37' are provided in said connector chamber 33 for turning the sensors to be unoperated.

Figure 7:
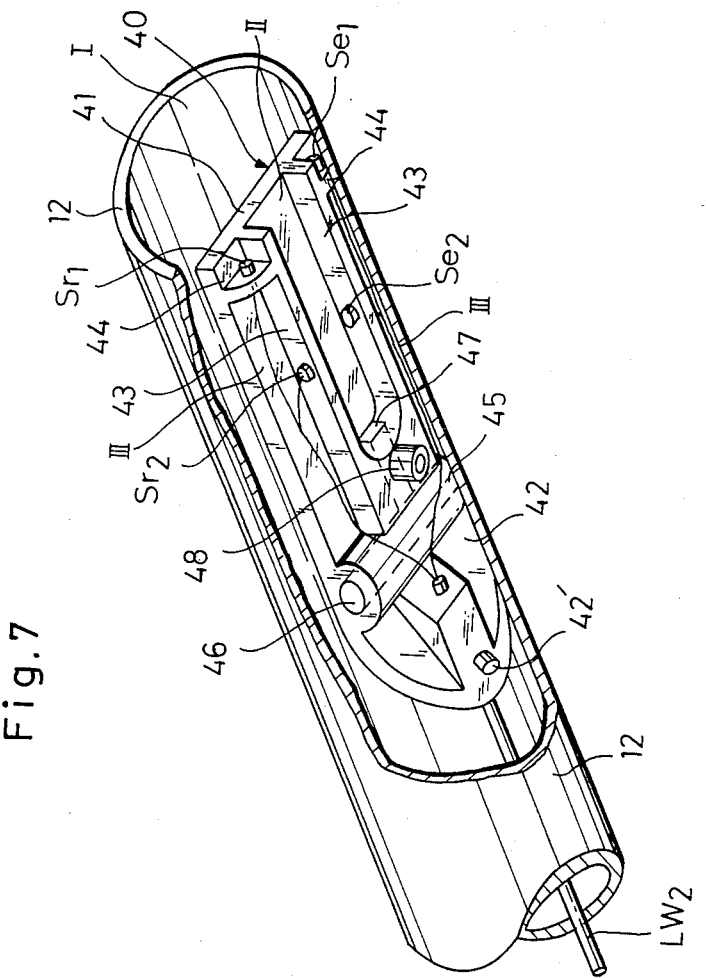
FIG. 7 is a perspective view of a barrel portion of the nozzle where a sensor casing in mounted.
Figure 8:
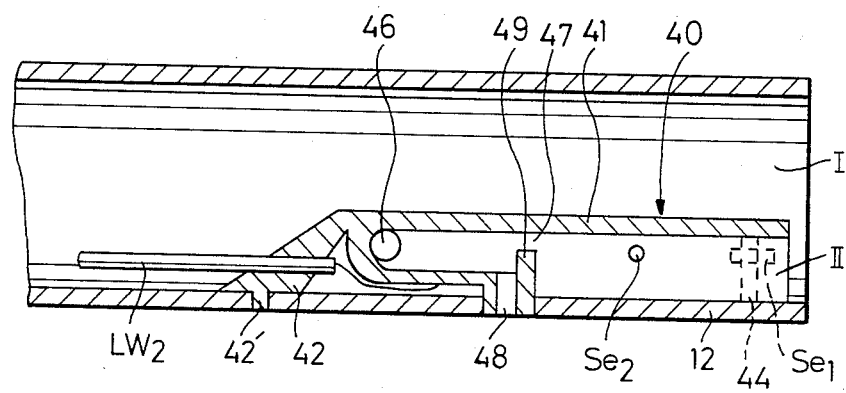
FIG. 8 is a side section of said portion.
Figure 9:
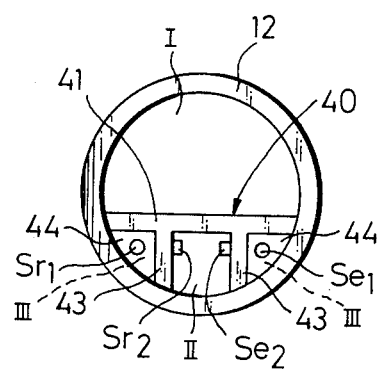
FIG. 9 is an end view of the tip end of the nozzle.

In reference to FIGS. 7, 8 and 9, the sensor casing represented generally by 40 comprises a longitudinally extending top wall 41 of which a tail portion is slanted to form a stream-lined end wall 42 and a pair of longitudinally and parallel extending side walls 43, 43 so that when said casing 40 is mounted on the inner bottom wall of the barrel portion 12, the space of said barrel portion is divided into four separated longitudinally extended spaces I, II and III, III at the area in the vicinity of the liquid outlet, as best shown in FIG. 9. The slanted end wall 42 has a downwardly projecting protrusion 42' to fit in a hole formed in the barrel wall for holding the casing 40 in position.

The upper space or channel I is for liquid such as fuel to be delivered out of outlet. The lower center space or channel II is for liquid delivered e.g. into a vehicle tank and rising up into the nozzle barrel portion 12 from outlet. The lower outer spaces or channels III, III are for a first sensor of the reflection type comprising a light emitter Se1 such as light emitting diode and a light receiver Sr1 as well as a second sensor of the contact type comprising an emitter Se2 and a receiver Sr2 which may be also the light emitting diode and the phototransistor. The leads of wire LW2 extend through lower outer channels III, III to supply electric energy to emitters Se1, Se2 and transmit the electric signal generated by receivers Sr1, Sr2.

The lower outer channels III, III are closed respectively by end walls 44, 44 in the vicinity of the outlet, each of which is formed with a hole for readily fitting the emitter Se1 or receiver Sr1 so that light emitted by the former is reflected from liquid splashes or bubbles momentarily existing for instance 3 cm ahead to be detected by the latter. The longitudinally extending side walls 43, 43 are respectively formed with opposite holes a little higher up from said end walls 44, 44 for readily fitting second emitter Se2 and receiver Sr2 so that normally detected light by the latter is interupted by liquid whose level is rising up through the channel II defined by side walls 43, 43.

In order that liquid may smoothly rise up through channel II, it is necessary to provide ventilation, which comprises a transversely extending partition wall 45 formed with a groove shown by phantom lines in FIG. 7 and having opposite open ends 46 which are in alignment with holes 11'' (FIG. 2) of the nozzle barrel 12. The groove is connected with a longitudinal groove shown also by phantom lines and opening 47 to center channel II. When liquid rises up through the channel II, air therein escapes from hole 47, through grooves and out of the holes 46, 11'' so that liquid may smoothly penetrate in channel II and the level thereof is accurately detected by the second sensor Sr2.

In order that splashes for bubbles eventually penetrating into the channel II from holes 11'', 46 and through said grooves to fall down along the wall may not erroneously effect on the sensor, there is preferably provided a hole 48 and a dam gate 49 to prevent liquid and bubbles from entering the channel II and expel out holes 46, 11''.

Lead wire LW2 extending from the terminal 36' in the connector chamber 33 passes liquid tightly through a groove formed in the tail end wall 42 thus, the leads are branched to extend through the respective side channel III to be electrically connected with the sensor elements Se1 and Se2 for energizing and sensor elements Sr1 and Sr2 for transmitting signals therefrom.

When the sensor elements have been fitted in the respective holes formed in the respective partition walls 43, 44 and the concerned leads have been arranged as referred to above, it is preferable to fill outer two channels III, III with resin such as epoxy resin which is superior in adhesiveness to metal, resistance to chemicals inclusive of vehicle fuel and electric insulation.

Such an assembled casing 40 can be readily mounted in correct position with aid of the downward protrusion 42' fitted in the hole formed in the barrel wall and firmly fixed on the inner wall surface by virtue of resin to provide the liquid tightly sealed upper channel I for liquid to be delivered and lower channel II for liquid delivered and rising up from the vehicle tank through the filler pipe.

Figure 10:
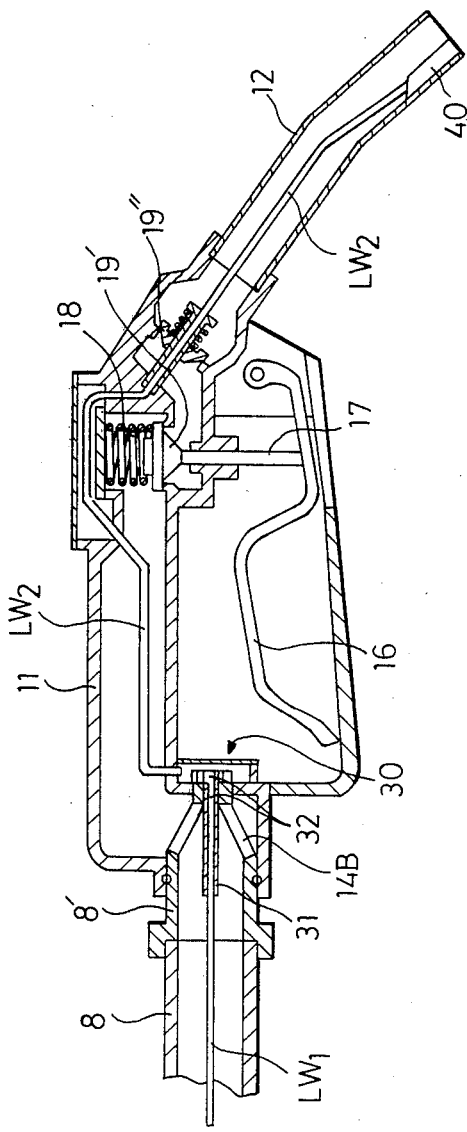
FIG. 10 is a longitudinally sectional view of another type of liquid delivery nozzle in which the sensor casing and the connector chamber are similarly provided according to the invention.

The present invention can be applied not only to the delivery nozzle as explained above and illustrated in FIGS. 2, 3 and 4 but also to another type of the delivery nozzle having a flexible hose connected coaxially to the body portion as illustrated in FIG. 10. In this embodiment the corresponding portions are represented respectively by the same reference numbers used in said FIGS. 2, 3 and 4.

In the delivery nozzle of FIG. 10, there is also a problem of the relative angular movement between the body portion 11 and the flexible hose 10 although this has no elbow 14 instead of which the amount 8' is directly coaxially inserted in the body portion 11.

When the nozzle 10 explained in the above description is taken up for fuel dispensing, the nozzle switch NS (see FIG. 1) is turned on so as to reset the delivered amount on the indicator 7 to zero.

When the nozzle 10, in which the first emitter Se1 is energized to emit on-and-off light, is inserted into the filler pipe, not shown, the light quantity detected by the first receiver Sr1 is smaller than that of a reference sensor (not shown) such as a phototransistor which is detected by the control means 6 to generate the corresponding signal which energizes the motor 3' to drive the pump 3 and actuates the valve 5 to be not full-open but partially open (e.g. 3 liters/min.) in order to avoid fuel surge.

When fuel delivery is started by pulling the trigger 16 to be engaged with the latch 17, the flow meter 4 is actuated by fuel flow and the pulse generator 4' gives corresponding signals to show the delivered fuel amount on the indicator 7.

The control means 6 is adapted to control the valve 5 via the valve actuator 5' to be gradually opened up to the full open position (e.g. 50 liters/min).

When the first receiver Sr1 receives light emitted by the first emitter Se1 energized to emit on-and-off light and reflected from fuel splashes and when the second receiver Sr2 normally receives light from the oppositely arranged second emitter without interruption by rising up fuel, the control means 6 is adapted for instance to gradually throttle the valve 5 to be partially open (e.g. 3 liters/min). If fuel splashes disappear and consequently the first receiver Sr1 turns not to receive any relfected light during valve throttling, the valve 5 is open again gradually.

When the second receiver Sr2 does not receive light from the second emitter Se2, the valve 5 is closed in reply to said detection. If this detection is caused not by the actual fuel level but by bubbles on the level, the second receiver Sr2 will receive light again after the lapse of a time, e.g. 1 second during which bubbles will disappear. The control means 6 is adapted to open the valve 5 to be slightly open (3 liters/min) after the lapse of this time interval.

If the second receiver Sr2 does not receive any light still after the lapse of said time interval, it means that the actual fuel level arrives at said second sensor level. Thus, the control means 6 is adapted to completely close the valve 5 and deenergize the motor 3'.

Of course the above operation is only one example and it is also possible, for instance, to close the valve instead of throttling the valve to open a little.

Due to provision of the reflection type sensor, it is also possible to avoid an eventual accident where the nozzle is incidentally slipped out of the filler pipe and fuel flows out of the nozzle by comparing the light quantity received by the first receiver Sr1 with that of said reference receiver, and by closing the valve 5 or deenergizing the motor 3' in reply to detection of that the former quantity is larger than that of the latter.

What is claimed is:

1. A liquid delivery nozzle comprising;
    a body portion having a passage for conducting liquid, valve means arranged in the passage and means for actuating said valve means,
    a mount for connecting a flexible supplier hose with the body portion so as to communicate the hose with the passage,
    a barrel portion having an open end as a liquid outlet while the other end is connected with said body portion so that, when said valve means is opened by said actuating means, liquid supplied through said hose may be delivered out of said outlet through the passage, and
    a casing mounted on the inner wall surface of the barrel portion in the vicinity of the outlet and having light emitting means and light receiving means mounted therein so as to detect rising liquid level and generate detection signal,
    said light emitting means and light receiving means consist of two pairs in which the first pair comprises a light emitter such as a light emitting diode and a light receiver such as a phototransistor respectively arranged at the forward end of said casing so that light emitted by the former when energized and reflected from rising liquid may be received by the latter to generate a signal, while the second pair comprises a light emitter such as a light emitting diode and a light receiver such as a phototransistor respectively arranged at a little higher up from said first pair and opposite to each other so that light emitted by the former when energized and normally received by the latter is intercepted by rising liquid to generate another signal.

2. The liquid delivery nozzle as claimed in claim 1, in which said light emitting and receiving means are respectively mounted on each of longitudinal walls of said casing, which has protrusion and a channel for leads connected to said means so that said casing may be mounted correctly in position on the inner wall surface of said barrel portion by fitting said protrusion in a hole formed in the barrel wall and fixed firmly on said wall surface with resin filled in said channel for leads.

3. The liquid delivery nozzle as claimed in claim 2, in which said casing is open at a head end and comprises a longitudinal wall, a slanted tail end wall which has the protrusion, a pair of longitudinal side walls respectively protruding from said longitudinal wall so that when mounting said casing on the inner surface of said barrel portion there are formed an upper channel for delivering liquid and a lower channel separated by said longitudinal wall, and said lower channel is further separated by said pair of side walls into a center channel for delivered and rising liquid of which level is to be detected and a pair of side channels for said leads, said casing further having a pair or partition walls so arranged as to respectively close said side channels at the head end, each of which is formed with a hole in which said sensor element is fitted.

4. The liquid delivery nozzle as claimed in claim 3, in which there is provided a transverse groove of which opposite open ends are arranged in alignment respectively with holes formed in the barrel wall, said groove being open at the tail end of said lower center channel so that air in said channel may escape through said groove when liquid delivered through said upper channel rises up through said lower center channel.

5. The liquid delivery nozzle as claimed in claim 4, in which a dam gate is arranged between the groove and the lower center channel, and a hole communicating with both the groove and the outside of the barrel portion is provided at the rear of the dam gate, whereby the splashed liquid going along the outer surface of the barrel portion and entering the groove is damed up at the dam gate and flows out through the hole without coming near the second pair of the light emitting means and light receiving means.

6. The liquid delivery nozzle as claimed in claim 5, in which the side walls of the casing are respectively formed with holes so that a light emitter and a light receiver are fitted in said holes opposite with each other as the second sensor, and the lower side channels, through which the leads from the first and second sensors extend, are filled with resin.

7. A liquid delivery nozzle comprising a body portion having a passage for conducting liquid, vlave means arranged in the passage, means for actuating said valve means, and a connector chamber, a mount arranged opposite to the connector chamger, for connecting a flexible supplier hose with the body portion so as to communicate the hose with the passage, said mount having a half portion which is diametrically and rotationally inserted into the body portion and terminated at the connector chamber and is formed with an opening for communication the nose with the passage, and another half portion protruded from the body portion so as to be connected with the hose, a barrel portion having an open end as a liquid outlet while the other end is connected with the body portion so that, when said valve means is opened by said actuating means, liquid supplied through said hose may be delivered out of said outlet, a casing mounted on the inner wall surface of the barrel portion in the vicinity of the outlet and having light emitting means and light receiving means mounted therein so as to detect rising liquid level and generate a detection signal, and connector means arranged for electrical connection of first leads extending through the hose and fixed at their one end to the mount and second leads extending through said barrel portion into said light emitting means and light receiving means and fixed at their one end to the connector chamber, said connector means essentially comprising a flat and flexible sheet on which a desired number of leads are parallelly arranged, said flat and flexible sheet being spirally formed in the connector chamber.

8. The liquid delivery nozzle as claimed in claim 7, in which said connector means further comprises a sleeve extending through the first half of the mount and fixed thereto to be angularly movable together therewith, the free end of the first half of the mount being held for angular movement just on an interior wall of the connector chamber and the sleeve passes through the interior wall to open in the connector chamber so that one half of the flat and flexible sheet in the L-shape extends through said sleeve in which the leads of the sheet is connected with the first leads while the other half of said L-shaped sheet is wound around the protruded end of said sleeve in said chamber so as to form a plurality of loose spiral turns at the free end of which the leads of the sheet are respectively connected with said second leads.

9. The liquid delivery nozzle as claimed in claim 7, in which the mount is of a form like an elbow.

10. The liquid delivery nozzle as claimed in claim 9, in which the sleeve is filled with a resin and the elbow is mounted in the nozzle body portion for angular movement via a swivel joint, said angular movement being restricted, by abutment of a protrusion and a pin respectively fixed to the body portion and the elbow, to an angle less than 360° so that the angular movement of said sleeve by such restricted angle may be dispensed with loosing and tightening of the spiral turns.

* * * * *